Figure 5:
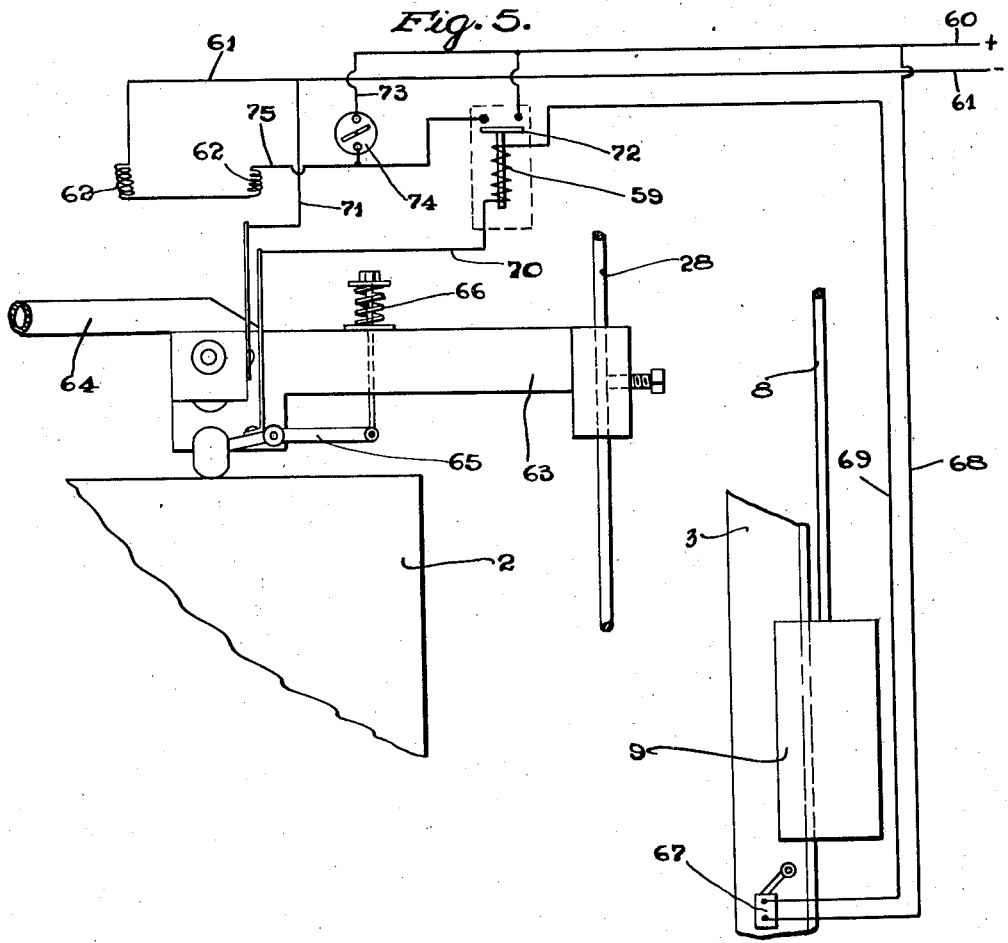

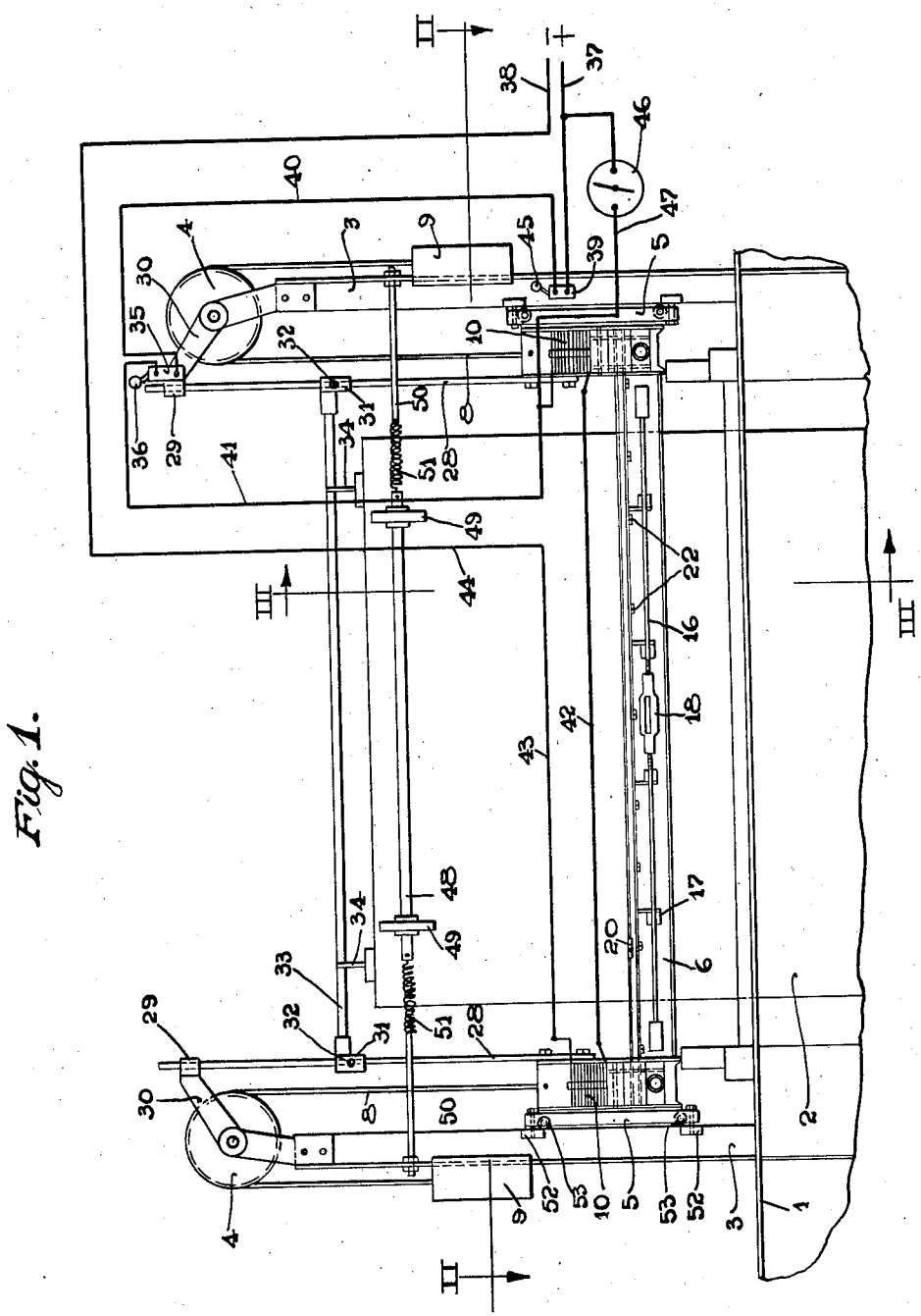

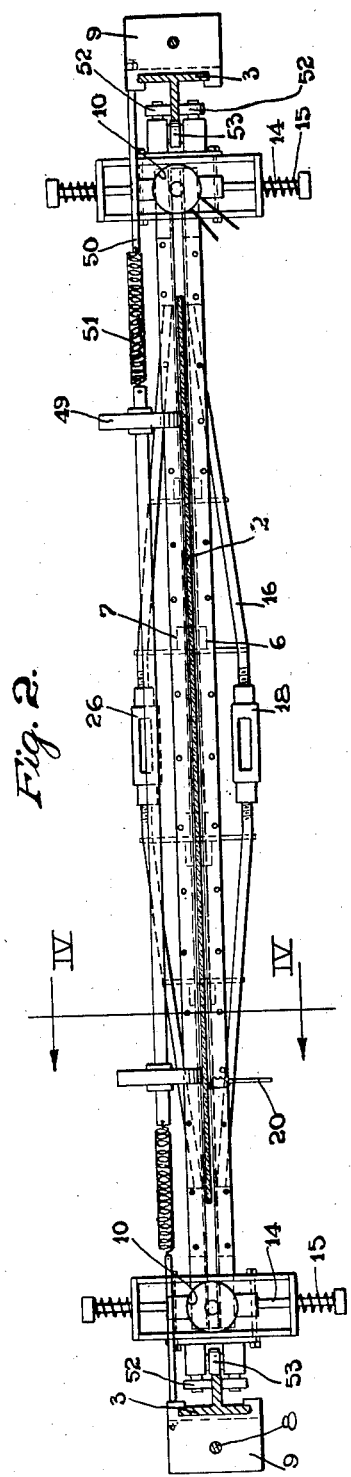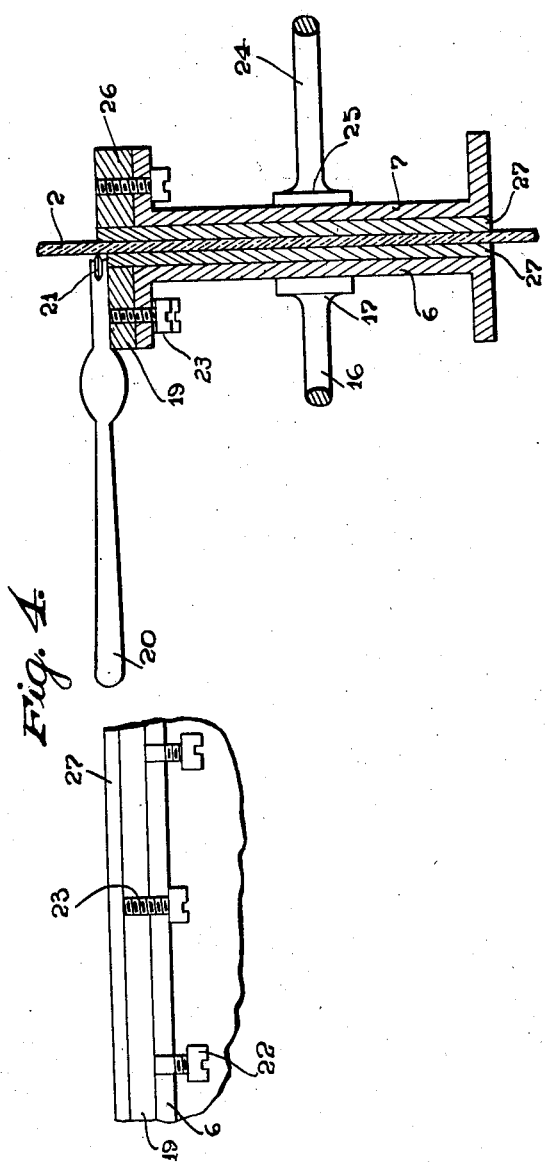

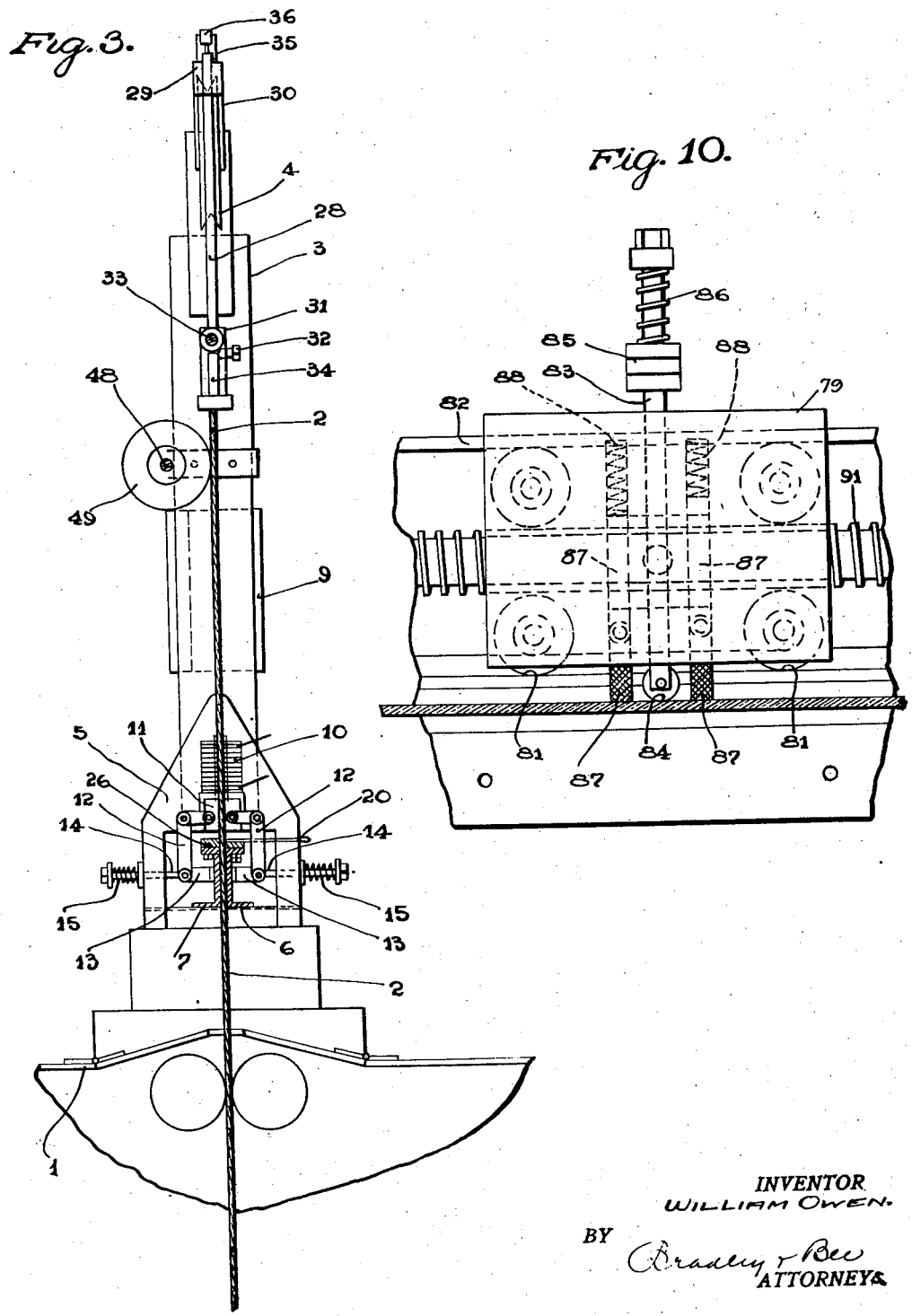

Sept. 18, 1934. W. OWEN 1,973,723
APPARATUS FOR SEVERING SHEET GLASS
Filed Aug. 15, 1933 6 Sheets-Sheet 5

INVENTOR
WILLIAM OWEN.
BY
Bradley & Bee
ATTORNEYS.

Sept. 18, 1934.　　　　W. OWEN　　　　1,973,723
APPARATUS FOR SEVERING SHEET GLASS
Filed Aug. 15, 1933　　6 Sheets-Sheet 6
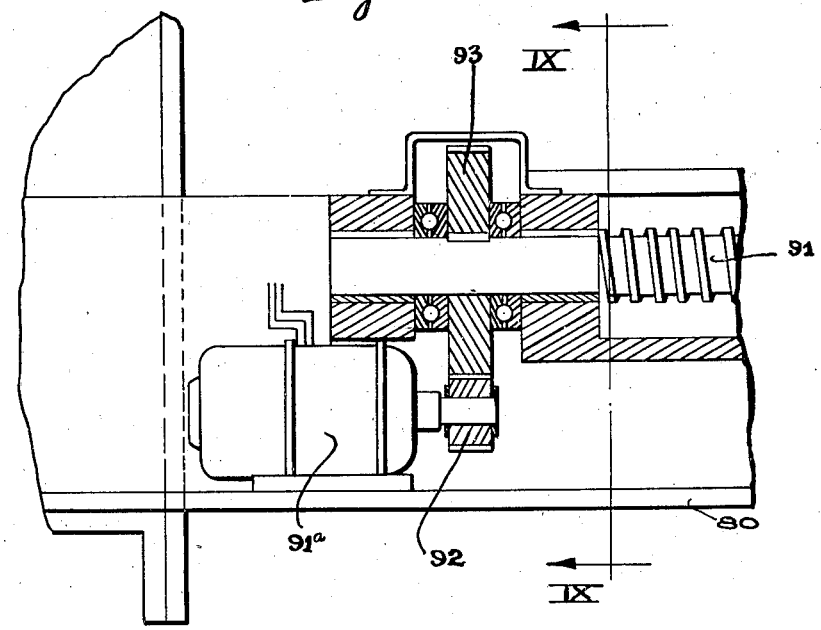
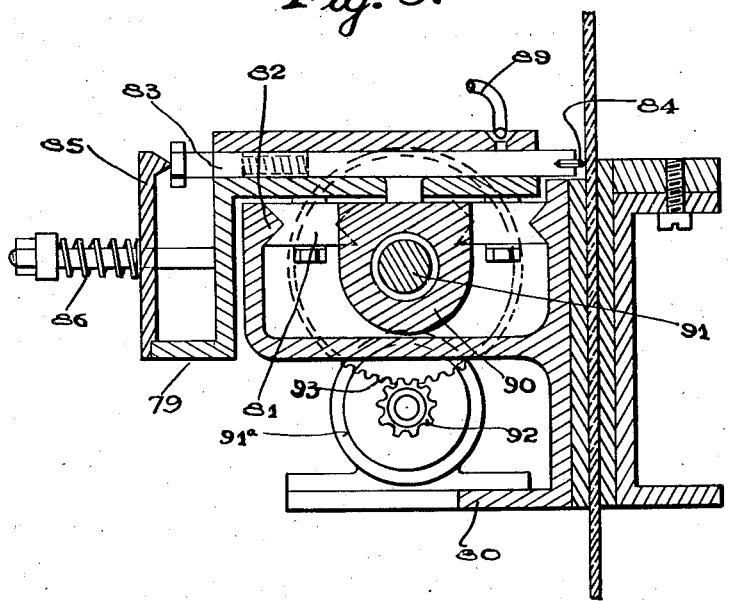
INVENTOR
WILLIAM OWEN.
BY
Bradley & Bee
ATTORNEYS.

Patented Sept. 18, 1934

1,973,723

UNITED STATES PATENT OFFICE 1,973,723

APPARATUS FOR SEVERING SHEET GLASS

William Owen, Pittsburgh, Pa., assignor to Pittsburgh Plate Glass Company, a corporation of Pennsylvania Application August 15, 1933, Serial No. 685,222

9 Claims. (Cl. 33—32)

The invention relates to apparatus for severing a continuously drawn sheet of glass as it emerges from the annealing leer. It has for its principal object the provision of an apparatus constituting an improvement over the type of apparatus shown in the Slingluff Patent No. 1,373,533 which may be utilized to advantage in cutting the sheet into sections of any desired width. A further object is the provision of apparatus of the character specified, which is in a large degree, or entirely, automatic, so that the work of the operators is reduced to a minimum, permitting fewer men to be used, and giving them an opportunity to devote their attention to other duties in connection with the care of the apparatus, such as the handling of the glass as it is cut, and the cutting of the strips into panes instead of doing this work in the cutting room. A further object of the invention is the provision of means for squaring the rule or cutter carrier employed, so that each cut is in parallel with the preceding one and at right angles to the center line of the sheet, thus reducing wastage to a minimum, and avoiding additional work in cutting the glass to square it up as would otherwise be necessary.

Figure 6:
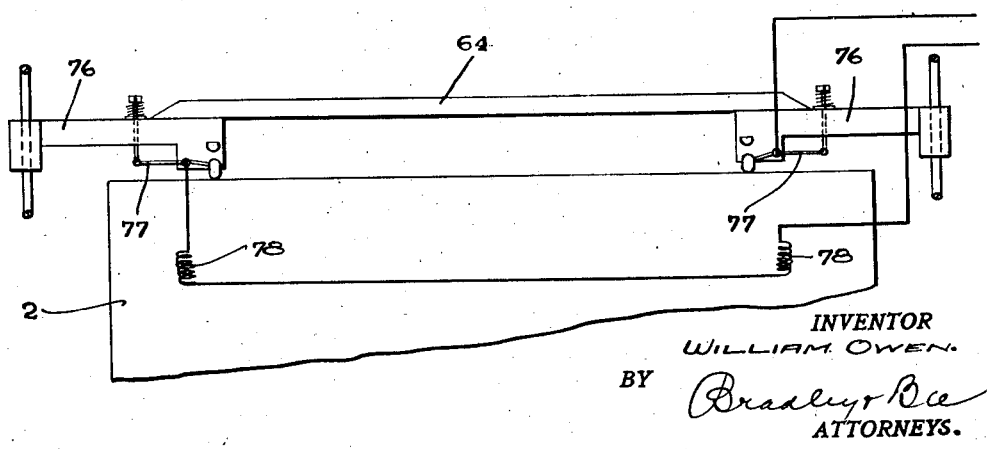
Figure 7:
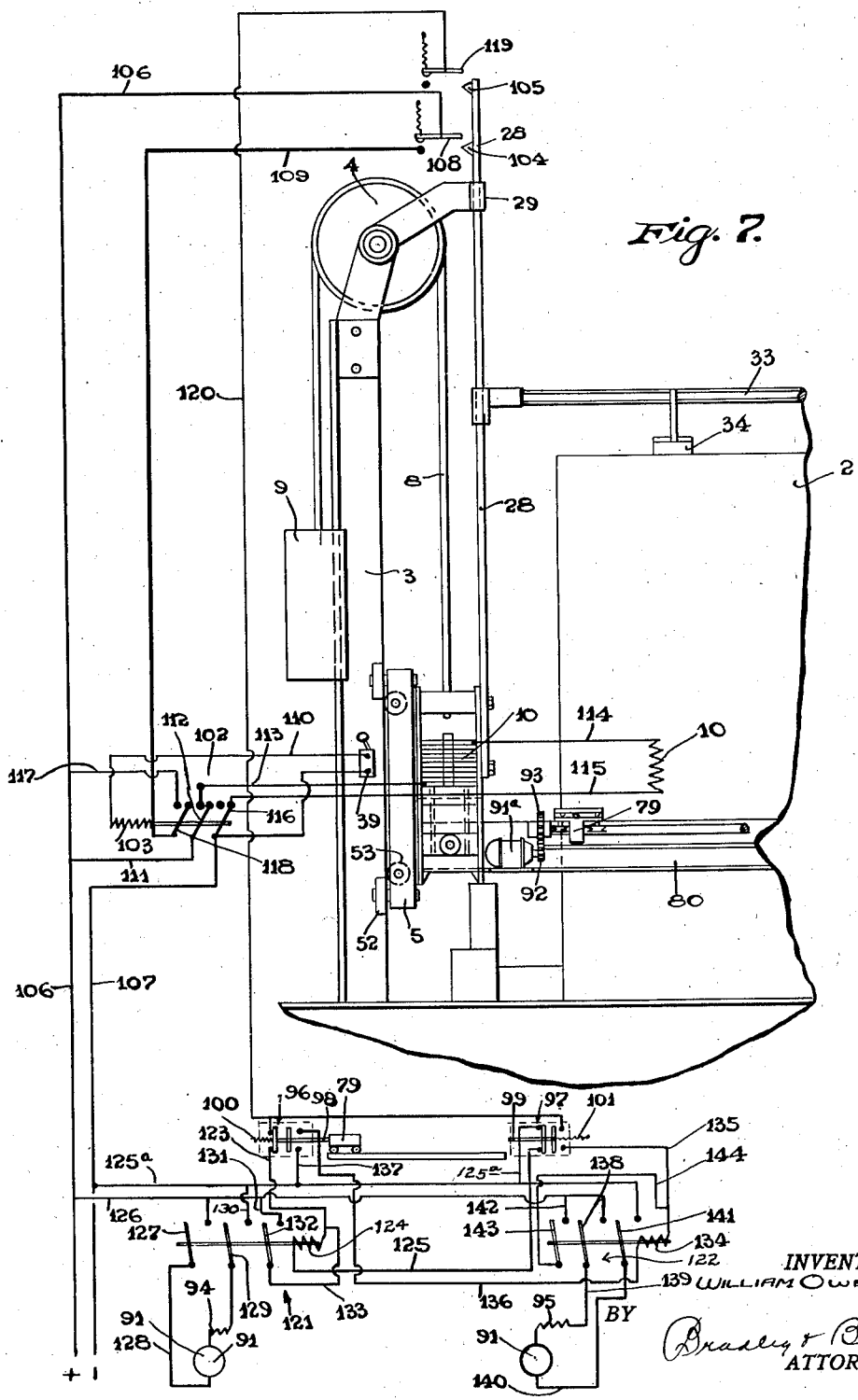

Briefly stated, the apparatus in its preferred form includes a rule or cutter carrier mounted for vertical movement on one side of the sheet with a clamping plate on the other side of the sheet mounted for vertical movement, and adapted to be clamped to the sheet, so that the rule moves upward with the sheet. As later described, the cutter may be hand operated or may be motor driven and carried by the cutting rule, and the rule and clamping member are flexibly mounted to permit the squaring of the rule with respect to the center line of the sheet just before the clamping action occurs. The squaring of the rule is accomplished by means which are engaged by the upper edge of the glass sheet. Automatic means regulated by the position of the upper edge of the glass causes the clamping action to occur when the glass strip to be cut off reaches the dimension for which the machine is set, and after the severing operation, the rule is released automatically and returned to starting position. When a motor is used to drive the cutting tool across the sheet, its movement in both directions may be accomplished automatically, thus making the entire apparatus automatic throughout except as to the removal of the glass strips after they are cut off. The plate which backs up the sheet opposite the line of cut is preferably faced with yielding material which improves the action of the cutter and tends to prevent any cut from running down vertically into the sheet when the plate is cracked off. Certain embodiments of the invention are illustrated in the accompanying drawings, wherein:

Figure 1 is a front elevation of the apparatus with the wiring diagram of the electrically operated parts applied thereto. Fig. 2 is a horizontal section on the line II—II of Fig. 1. Fig. 3 is a section on the line III—III of Fig. 1. Fig. 4 is a partial front elevation showing a modification. Fig. 5 is a partial front elevation showing a modification. Fig. 6 is a partial front elevation showing another modification. Fig. 7 is a partial front elevation showing a form of the device in which a motor is used upon the rule for operating the cutter, such view also showing a wiring diagram. Figs. 8, 9, and 10 are enlarged detail views of the Fig. 7 construction, Fig. 8 being a partial plan view and partial front elevation, Fig. 9 being a section on the line IX—IX of Fig. 8, and Fig. 10 being a plan view.

Referring to Figs. 1 to 4, which illustrate the simplest form of the apparatus, in which a hand cutter is used in connection with the straight edge or rule, 1 is the floor upon which the apparatus is mounted and 2 is a sheet of glass which is being delivered continuously upward through an annealing leer lying below the floor and not shown. The apparatus is guided and supported upon a pair of standards 3, 3, which are T-shape in cross section (Fig. 2) and carry the sheaves 4, 4 at their upper ends. Guided for vertical movement on the guides or standards 3, 3 are a pair of U-shaped brackets 5, 5 (Fig. 3), which carry the straight edge or rule 6 and the clamping plate 7, such parts lying on opposite sides of the glass sheet 2, as indicated in Fig. 4. Connected to the upper ends of the brackets 5, 5 are the cables 8, 8 which pass up over the sheaves 4, 4 and carry at their other ends the counterweights 9, 9, thus serving to counterbalance the weight of the brackets 5, 5 and the parts carried thereby.

Means are provided at each end of the rule and clamping plate for moving them toward each other in the form of the solenoids 10, 10, to whose plungers 11, 11 the bell crank levers 12, 12 are pivoted. The other ends of these bell crank levers are pivoted to the brackets 13, 13 carried respectively by the rule 6 and clamping plate 7. When the windings of the solenoids are energized, the plungers 11, 11 are moved upwards, causing the rule and clamping plate to approach each other and grip the glass therebetween. In order to move the rule and clamping plate in the reverse direction, the rods 14, 14 are provided, such rods being pivoted to the ends of the bell crank levers 12, 12 and held outward by means of the springs 15, 15. The clamping means is thus moved to release position when the flow of current through the solenoids 10, 10 is interrupted.

The cutting rule 6 is preferably formed of a channel, as indicated in Fig. 4, and is stiffened by means of the tie member 16 passing over suitable brackets 17 and provided with the turnbuckle 18. The upper edge of the channel is provided with a plate 19 which acts as a guide for the cutting tool 20 which is provided with the usual diamond or wheel 21. In order to provide for the leveling up of the plate 19, the plurality of screws 22 are employed extending through the upper flange of the channel and bearing against the bottom of the plate. The plate is clamped down against the ends of the screws 22 by means of the screws 23 (Fig. 4). The clamping plate 7 has a construction quite similar to that of the rule or straight edge in that it consists of a channel provided with a strut 24 passing over brackets 25 and provided with a turnbuckle 26. The upper flange of the channel 7 carries a plate 26 which extends up slightly above the level of the cutting wheel as indicated in Fig. 4. The faces of the channels 6 and 7 which engage the glass sheet 2 are provided with sheets of yielding refractory material 27, 27, such as asbestos cloth. When the glass sheet is clamped between the members 6 and 7, such members move upwardly with the sheet, and it is during this period that the cutter runs the tool 20 along the plate 19 as a guide and scores the glass. At this time, the operator grasps the upper edge of the glass sheet and applies sufficient pressure to cause the glass to crack off along the line of scoring.

The apparatus includes means for squaring up the sheet and for making its operation automatic in connection with the clamping means which will now be described. Bolted to the brackets 5, 5 and extending upwardly therefrom are a pair of bars 28, 28 which extend through guides 29, 29 carried by the arms 30, 30. Adjustable longitudinally of the rods 28, 28 are a pair of angular brackets 31, 31 which can be held in any desired position of adjustment along the rod by means of the set screws 32, 32. A bar 33 extends transversely between the brackets and has its end swivelled therein. This bar 33 is provided with a pair of downwardly projecting arms 34, 34 adapted to engage the upper edge of the glass sheet. This engagement occurs when the sheet is of a proper length to be cut off and the upward movement of the bar 33 automatically operates the clamping means so that the sheet is gripped between the rule or straight edge and the clamping plate. The actuating mechanism for securing this result includes a normally open limit switch 35 whose arm 36 is engaged by the upper end of the right hand rod 28 when the time arrives for clamping the straight edge in position preliminary to cutting off the sheet. Current is supplied through the switch for operating the solenoids 10, 10 from the leads 37 and 38, and this circuit also includes a second limit switch 39 which is normally closed and whose function will be later described.

When the right hand rod 28 closes the switch 35, current flows through the windings of the solenoids 10, 10 from the lead 37 via the switch 39, wire 40, switch 35, wire 41, and wires 42, 43, and 44, thus causing the operation of the solenoids so that the glass sheet is clamped between the rule 6 and the plate 7. As the rule now moves up with the glass, the operator uses the cutter 20 to score the glass sheet from one edge to the other and by applying a slight amount of pressure to the upper edge of the sheet, it is cracked off and removed from the machine. A further upward movement of the rule causes the right hand counterweight 9 to engage the arm 45 of the limit switch 39 and open such switch, thus breaking the circuit through the windings of the solenoids and permitting the springs 15, 15 (Fig. 3) to separate the rule and clamping plate, thus releasing their clamping engagement with the glass sheet. The weight of the brackets 5, 5 and the parts carried thereby is sufficient to move these parts, including the rule, back to their starting position by gravity, thus permitting the switch 35 to open and the switch 39 to close, so that the parts are in their original starting position. If desired, the solenoid and clamping mechanism may be operated by hand by the use of the hand switch 46. When this switch is closed, the lead 37 is connected with the wire 47 and current flows through the windings of the solenoids via such wire and the wires 42, 43, and 44.

In order to insure that the upper edge of the glass sheet will always lie in the same vertical plane and thus always engage the lower ends of the arms 34, 34, means are provided for guiding the sheet. This means comprises a transverse rod 48 on which are swivelled two rollers 49, 49 engaging the face of the sheet. The rod 48 is yieldingly supported from the rods 50, 50 by means of coil springs 51, 51. The transverse rod 33 in connection with the arms 34, 34 and the rods 28, 28 also serve another important function, namely the squaring up of the rule 6 with the upper edge of the sheet so that when a cut is made along the rule 6, the line of cut will be in parallel with the upper edge of the sheet. The brackets 5, 5 are guided on the standards 3, 3 by means of the sets of rollers 52, 53, and sufficient play is allowed between these rollers and the flange on the standard 3, on which they are guided, so that the brackets 5, 5 and the rule carried thereby can be moved sufficiently by the parts 34, 33, and 28, as actuated by the edge of the glass sheet, to shift the rule so that it is brought in parallel with the upper edge of the sheet. This squaring up action is accomplished before the upper end of the rod 28 closes the switch 35 so that when the clamping means are actuated by the closing of the switch 35, the rule 6 is in parallel with the upper edge of the glass sheet. It follows that if the initial edge as cut at the top of the sheet is at right angles to the center line of the sheet, all of the successive cuts will be at right angles to the center line of the sheet and the glass section which is cut from the continuous sheet will in all cases be perfectly rectangular, thus avoiding the necessity of subsequent trimming to bring the section to such shape.

Fig. 5 illustrates a modification in which the squaring up device is differently constructed and the electrical control means is modified. In this construction, a time relay is employed in order to give the necessary interval between the squaring up of the sheet and the operation of the clamping means. Referring to the drawings, 59 is the coil of the time relay; 60 and 61 are the leads for supplying current; 62, 62 are the windings of the clamping solenoids; 63 is one of the squaring up arms for engaging the upper edge of the sheet, such arm being connected to another arm near the other edge of the sheet by means of the tie rod 64; 65 is a switch arm normally held in open position by means of the spring 66; and 67 is a limit switch corresponding in function to the switch 39 shown in Fig. 1 and operated by the counterweight 9 in the same manner as heretofore described in connection with Fig. 1. When the upper edge of the glass sheet 2 engages the arms 63, 63, the rule is squared up as heretofore described in connection with the Fig. 1 construction. At the same time, the edge of the sheet causes the switch arm 65 to close. This completes a circuit through the coil of the time relay via the wire 68, switch 67, wire 69, wire 70, switch arm 65, and the wire 71. This causes the switch 72 to close, but there is a period of delay due to the character of the relay so that this closure does not occur immediately, thus providing time in which the squaring up operation can occur before the solenoid windings are energized to clamp the cutting off roll to the glass. When the switch 72 closes, current flows through the windings 62, 62 of the solenoids via the wire 73, hand switch 74, wire 75, and lead 61. After the cutting operation is completed, the engagement of the counterweight with the arm of the switch 67 interrupts the circuit through the coil of the time relay, so that the switch 72 opens, interrupting the circuit through the solenoid winding 62, 62, releasing the clamping means. The parts then move back by gravity to their original starting positions.

Fig. 6 illustrates still another modification in which the squaring up arms 76, 76 are each provided with a switch 77 which is closed by the upward movement of the glass sheet 2. These switches are in circuit with the solenoid windings 78, 78, so that no current flows through the solenoid windings until both switches are closed. In case the upper edge of the sheet is not horizontal, the closure of one switch during the squaring up operation will not cause the clamping mechanism to operate since such clamping mechanism will operate only when both switches are closed. The construction, therefore, insures that the squaring up operation shall be completed before the clamping operation, and this is accomplished without the use of a time relay such as that employed in connection with that of Fig. 5. In other particulars, the construction parallels that of Figs. 1 and 5.

The construction of Figs. 7 to 10 is similar to that of Fig. 1, except that in this construction, power means is employed for operating the cutting off tool. This includes a motor carried by the cutting off rule or straight edge and mechanism driven by the motor for moving the cutter along the rule and then returning it to starting position. Provision is also made in this construction for making the operation of the motor which drives the cutting off tool automatic so that after the glass sheet is clamped between the rule and clamping plate, the motor which moves the cutter is automatically started, and after the cutting off operation is completed, returns the cutter to starting position. The operator is thus relieved from all labor with the exception of handling the glass sheets to crack them off and remove them after the cutting or scoring tool has performed its function.

Referring to the drawings, 79 is the cutter carriage mounted for movement along the rule or straight edge 80. The carriage is provided on its lower side with four wheels 81 which engage the guides 82 on the rule and has mounted in its upper portion the cutter spindle 83 carrying the cutter 84 and yieldingly held forward by the arm 85 engaged on its rear side by the spring 86. Felt wipers 87, 87 are also mounted in the carriage and pressed forward by the springs 88, 88. These wipers are supplied with kerosene by means of pipes 89. The carriage is provided with a depending nut 90 and this nut is engaged by a screw 91 swivelled at its ends in the rule 80 and driven from the motor 91a through the intermediary of the gears 92 and 93. The motor is of the reversing split field type shown diagrammatically at the bottom of Fig. 7 and having the fields 94 and 95 arranged so that when current is supplied through the field 94, the motor is driven forwardly to move the carriage 79 along the rule 80 toward the right to form the cutting operation, and when current is supplied through the field 95, the motor is driven in the reverse direction to bring the carriage back to starting position.

A pair of switches 96 and 97 are employed in connection with the carriage having plungers 98 and 99 adapted to be engaged by the carriage when in its two extremes of movement, as indicated diagrammatically at the bottom of Fig. 7. The switch 96 is normally held open by means of the spring 100, while the switch 97 is normally held closed by the spring 101. A relay 102 governs the solenoid windings 10, 10 which clamp the rule or straight edge to the glass, as heretofore described in connection with Fig. 1, similar parts in the constructions of Fig. 7 and Fig. 1 being given similar reference numerals. This relay 102 is provided with a holding coil 103 which functions as hereafter set forth. The upper end of the rod 28 whose movement is controlled from the edge of the glass through the parts 33 and 34 is provided with a pair of operating cams 104 and 105, the cam 104 serving to control the actuation of the clamping mechanism, while the cam 105 controls the operation of the motor 91. The cam 104 comes into operation first, thus clamping the rule 80 to the glass, after which the motor is started to cause the carriage 79 to travel across the sheet.

Current is supplied from the leads 106 and 107, and when the cam 104 engages and closes the switch 108, current flows through the holding coil 103 of the relay 102 via the lead 106, switch arm 108, wire 109, wire 110, limit switch 39, and wire 107. This causes the relay to close and current is then supplied through the windings of the solenoids 10, 10 via the wire 111, relay arm 112, wire 113, wires 114, 115, relay arm 116, and wire 107, thus causing the rule to be clamped to the glass so that it moves along therewith. After the cam 104 passes the switch arm 108, the circuit is broken at this point, but the relay switch 102 remains in its closed position due to the holding coil 103, to which current is supplied via the wire 117, switch arm 118, wire 110, switch 39, and wire 107. The relay, therefore, remains closed and the clamping apparatus remains in clamping position until the counterweight 9 opens the limit switch 39, at which time the clamping apparatus is released and the parts returned to starting position, as heretofore described in connection with the Fig. 1 construction.

After the clamping mechanism has been brought into play, through the operation of the switch arm 108 by the cam 104, as above described, the cam 105 closes the switch arm 119, so that current from the wire 119 flows through the wire 120 and actuates the relays 121 and 122, which govern the operation of the motor 91.

When the parts are in starting position, the carriage 79 holds the switch 96 in closed position as shown, so that current from the wire 120 flows through the line 123, through the holding coil 124, the wire 125, switch 97, and wire 125a, to the negative lead 107. This closes the relay 121 so that current is supplied through the motor winding 94 via the wire 126, relay arm 127, wire 128, relay arm 129, and wires 130 and 125a. The motor now operates the carriage moving the cutter across the glass from left to right and scoring it. This movement continues until the carriage 79 strikes the plunger 99 and opens the switch 97. During this period of travel, and as soon as the carriage leaves the plunger 98, the switch 100 opens, thus interrupting the flow of current at this point, but the relay 121 remains in closed position due to the holding circuit through the coil 124, which holding circuit includes the wire 131, switch arm 132, wire 133, wire 125, switch 97, and wire 125a. The motor, therefore, continues running until the carriage 79 strikes the plunger 99 and opens the switch 97, breaking the circuit through the holding coil 124 so that the relay 121 opens and interrupts the flow of current through the field 94 of the motor. The movement of the motor and carriage is thus stopped. The glass sheet is now snapped off and the parts return to starting position as shown in Fig. 7 with the cutting rule and rod 28 in extreme lower position ready to repeat the clamping and cutting cycle as heretofore described. The engagement of the car with the plunger 99 and its movement to the right completes the circuit between the wires 120 and 135 so that when the next sheet of glass closes the switch 119, a holding circuit through the coil 134 of the relay 122 is completed. This closes the switch 122 so that current flows through the field 95 of the motor via the wire 126, relay arm 138, wire 139, wire 140, relay arm 141, and wire 125a. This causes the motor to run in a reverse direction so as to move the carriage back to starting position, so that the second sheet of glass is cut off on this reverse movement of the carriage. When the carriage moves away from the plunger 99, the switch 97 closes to the position shown in Fig. 7, but a circuit is still maintained through the holding coil 134 via the wire 126, wire 142, relay arm 143, wire 144, wire 136, switch 100, and wires 137 and 125a. The circuit through the field 95 of the motor is thus maintained until the car arrives at its original starting position, as shown in Fig. 7, at which time it engages the plunger 98 and interrupts the holding circuit by opening the switch 96. When the holding circuit is thus interrupted, the relay 122 opens, interrupting the circuit through the motor field 95. This completes the cycle, putting the parts in their original positions so that the operation as heretofore described is repeated. The cycle is repeated over and over again as long as may be desired, and little time is lost since, as above described, a cut is made on both the forward and the return movement of the carriage.

What I claim is:

1. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, and squaring means for the rule carried thereby and adapted to engage the forward edge of the sheet and bring the rule into parallelism with such forward edge of the sheet preliminary to the clamping action.

2. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, and squaring means for the rule carried thereby and adapted to engage the forward edge of the sheet and bring the rule into parallelism with such forward edge of the sheet, and means carried by the squaring means for causing the clamping means to operate.

3. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, and squaring means for the rule carried thereby and adapted to engage the forward edge of the sheet and bring the rule into parallelism with such forward edge of the sheet, and means operated by the forward movement of the sheet for causing the clamping means to operate.

4. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, a carriage movable along the rule and provided with a cutter, an electric motor on the carriage for moving it, means actuated by the movement of the sheet for causing the clamping means to operate, and automatic means timed to permit of flow of current to the motor after the sheet is engaged by the clamping means.

5. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, a carriage movable along the rule and provided with a cutter, an electric motor on the carriage for moving it, means actuated by the movement of the sheet for causing the clamping means to operate, and automatic means timed to permit of flow of current to the motor after the sheet is engaged by the clamping means, and to reverse the motor to return the carriage to starting position after the cutting operation.

6. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, squaring means for the rule carried thereby and adapted to engage the forward edge of the sheet and bring the rule into parallelism with such forward edge of the sheet preliminary to the clamping action, and means engaging the face of the sheet and guiding it so that its upper edge will engage the squaring means.

7. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, squaring means for the rule carried thereby and adapted to engage the forward edge of the sheet and bring the rule into parallelism with such forward edge of the sheet preliminary to the clamping action, and yielding means engaging the face of the sheet and guiding it so that its upper edge will engage the squaring means.

8. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, squaring means for the rule carried thereby and adapted to engage the forward edge of the sheet and bring the rule into parallelism with such forward edge of the sheet preliminary to the clamping action, and a rod extending transversely of the sheet and provided with rollers engaging the face of the sheet and guiding it so that its upper edge will engage the squaring means.

9. Apparatus for severing a continuously formed advancing sheet of glass comprising a clamping means, including a cutting rule and clamping plate mounted on opposite sides of the sheet for movement therewith, means for moving the rule and plate toward each other to clamp the sheet therebetween, squaring means for the rule carried thereby and adapted to engage the forward edge of the sheet and bring the rule into parallelism with such forward edge of the sheet preliminary to the clamping action, and a rod extending transversely of the sheet and provided with rollers engaging the face of the sheet and guiding it so that its upper edge will engage the squaring means, said rod being spring-supported at its ends.

WILLIAM OWEN.